March 4, 1952 W. F. WILSON 2,588,333
DRIVE AXLE AND TRACK FRAME MOUNTING FOR CRAWLER TRACTORS
Filed March 3, 1947 3 Sheets-Sheet 1

INVENTOR
William F. Wilson
BY
ATTORNEY

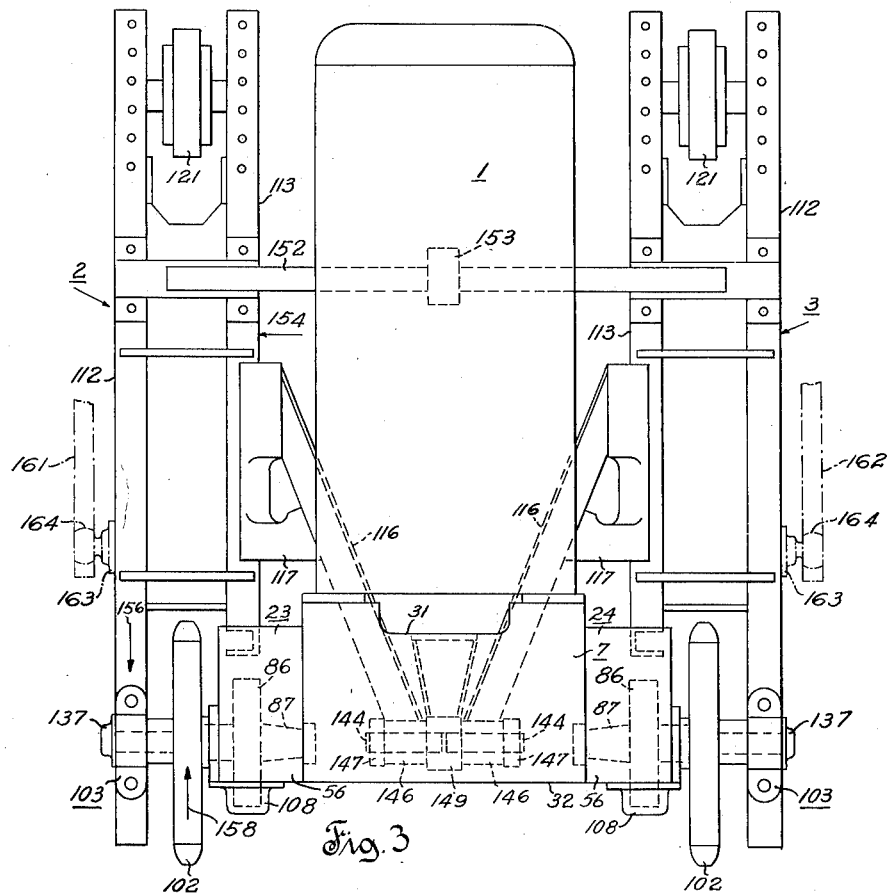

March 4, 1952      W. F. WILSON      2,588,333
DRIVE AXLE AND TRACK FRAME MOUNTING FOR CRAWLER TRACTORS
Filed March 3, 1947      3 Sheets-Sheet 3
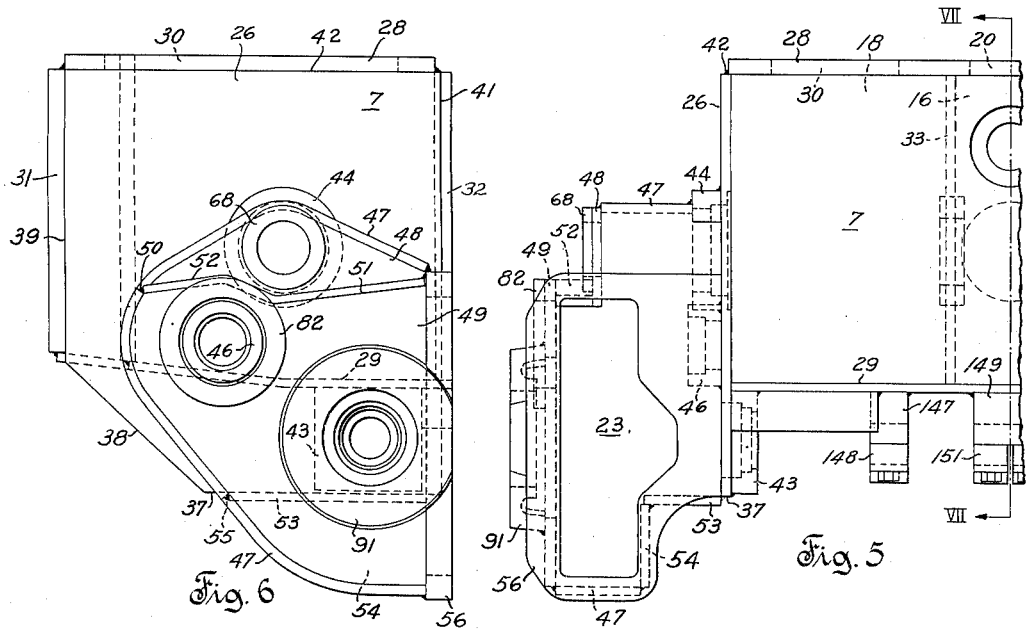
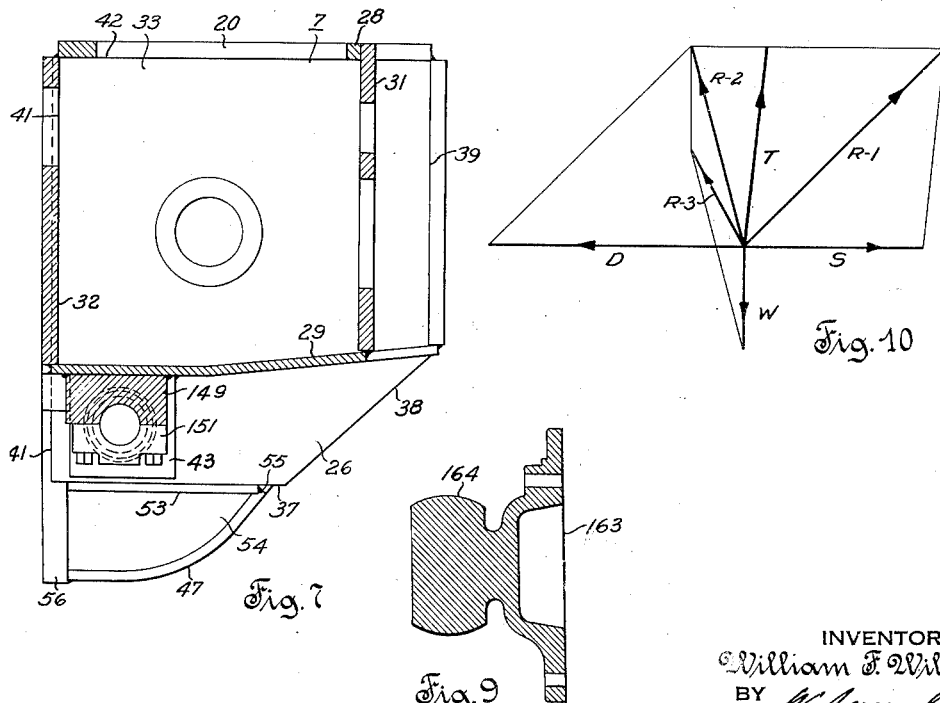
INVENTOR
William F. Wilson
BY
ATTORNEY Patented Mar. 4, 1952

2,588,333

UNITED STATES PATENT OFFICE 2,588,333

DRIVE AXLE AND TRACK FRAME MOUNTING FOR CRAWLER TRACTORS

William F. Wilson, Wauwatosa, Wis., assignor to Allis-Chalmers Manufacturing Company, Milwaukee, Wis., a corporation of Delaware Application March 3, 1947, Serial No. 732,029

3 Claims. (Cl. 180—9.1)

The invention relates to motor vehicles, and it is concerned more particularly with an improved drive axle and track frame mounting for crawler tractors.

In the construction of crawler tractors as disclosed, for instance, in U. S. Patent 1,968,419, granted on July 31, 1934, to E. F. Norelius for Transmission Mechanism, it has heretofore been a common practice to mount the track belt drive sprockets in overhanging relation to the main body of the tractor at opposite sides and at the rear of the latter, and to transmit driving power to these sprockets through final drive gears, that is, through individual speed reducing gear trains at opposite sides, respectively, of the tractor. A large, walled structure which forms the rear part of the main body and which serves as a transmission housing is usually employed to mount the final drive gears and other mechanism, such as a pair of steering clutches, a common drive shaft for the latter, and a bevel gear and pinion drive for transmitting power to the drive shaft of the steering clutches.

While all of the mentioned power transmitting mechanism is amply proportioned to handle the available engine power, its ability to do so efficiently and without interruption during long periods of operation, is usually dependent upon refinements of construction, as is well known in the art. For instance, certain critical dimensions which determine the relative position of the cooperating elements of each final drive gear train must be maintained within very close limits in order to insure efficient and trouble-free operation of said gears under heavy loads. And similarly, the efficiency and satisfactory operation of certain oil seals which are employed to retain lubricant in the transmission housing are usually dependent upon a highly accurate relation of the cooperating parts thereof.

According to established usage, the transmission housing, in addition to serving as a support for the track belt drive sprockets, final drive gearings and associated power transmitting mechanism, also constitutes that part of the main body of the tractor on which the track frames are mounted for pivotal up and down movement independently of each other. In order to provide the required pivotal mountings for the track frames at opposite sides of the main body, it has heretofore been customary to secure a one-piece axle or a pair of alined stub-axles, as shown in the hereinabove mentioned Norelius patent, in rigid, non-rotatable relation to the transmission housing, and to pivot the track frames at their rear ends on overhanging portions of such dead axle or axles. While the primary purpose of such an arrangement is to support the main body at its rear end on the track frames, the loads resulting from the weight of the main body are usually not the only ones which are intended to be transmitted from the main body to the track frames, and vice versa, through the mentioned dead axle or axles. The track frames must be stabilized against toeing in and out and against lateral tilting relative to the main body, and arrangements involving the dead axle or axles to provide for the necessary horizontal and vertical stability of the track frames are quite common. Moreover, it is usual to connect certain types of tractor operated equipment, particularly bulldozers, in thrust transmitting relation directly to the track frames rather than to the main body of the tractor, and it is apparent that under these conditions the dead axle or axles, as well as the transmission housing are apt to become most severely stressed during operation of the tractor.

During the past, it has been found extremely difficult in tractors of the hereinabove outlined character, to prevent the normally heavy, and under certain conditions extremely severe loads to which the transmission housing becomes subjected, from upsetting the highly accurate relation between the cooperating elements of the final drive gear trains and other parts, and which accurate relation is required, as pointed out hereinbefore, for efficient and trouble-free operation of the tractor. Failure of the final drive gears has been one of the most persistent troubles in crawler tractors as heretofore constructed, and various attempts have been made, as evidenced for instance by U. S. Patent 2,391,001, granted on December 18, 1945, to D. B. Baker et al., and by U. S. Patent 2,453,360, granted on November 9, 1948, to G. E. Burks, to avoid relative displacement of the final drive gears, and consequent undue stresses and ultimate failure of these gears under heavy loads.

Generally, it is an object of the invention to provide an improved drive axle and track frame mounting which will overcome the hereinabove outlined difficulties in a practical and fully satisfactory manner.

More specifically, it is an object of the invention to provide an improved drive axle and track frame arrangement which will efficiently function to transmit power to the track belt drive sprockets, which will insure proper stability of the track frames against toeing in and out and against lateral tilting, and in which the cooperative relation between the elements of the final drive gear trains will not be adversely affected by heavy loads to which the track frames may become subjected under severe operating conditions of the tractor, as during steering or bulldozing.

A further object of the invention is to provide an improved drive axle and track frame arrangement of the character set forth hereinbefore, in which rotary shaft seals for retaining a lubricant supply in an enclosure for the final drive gears are of relatively small diameter.

A further object of the invention is to provide an improved drive axle and track frame mounting which will satisfactorily take care of the load conditions which arise when the track belt tension is increased beyond normal, as for instance when a stone or other solid obstruction becomes lodged on one of the track belts and is forced to pass with the latter around the respective track belt drive sprocket, the improved mounting being such that the transmission housing and the bearings for the track belt drive sprockets will not become subject to objectionable or harmful stresses under said conditions, that is, to stresses which would disturb the proper mesh and load distribution of the final drive gears.

A further object of the invention is to provide an improved crawler type tractor of the three-point suspension type, in which the transverse pivot axis about which the track frames are swingable up and down independently of each other, coincides with the axis of rotation of the track belt drive sprockets, and in which the final drive gears and the oil seals associated with the transmission housing will reliably function without undue wear or failure during long periods of service under the most punishing operating conditions.

A further object of the invention is to provide an improved crawler type tractor of the character set forth hereinbefore, in which the track belt drive sprocket and the track frame, at each side of the tractor, cooperate to relieve the mounting of the track belt drive sprockets on the transmission housing from undue stresses under certain operating conditions, as during steering or bulldozing.

A still further object of the invention is to provide an improved crawler tractor of the character set forth hereinabove, in which inboard and outboard pivot bearings for the track frames are mounted on the main body at a desirable transverse spacing from each other, which will provide satisfactory stability of the track frames against toeing in and out and against lateral tilting.

These and other objects and advantages are attained by the present invention, various novel features of which will be apparent from the description herein and accompanying drawings disclosing an embodiment of the invention, and will be more particularly pointed out in the appended claims.

In the drawings:

Figs. 3 and 4 are schematic top and rear views, respectively, outlining in general the tractor shown in Fig. 1, portions of a bulldozer attachment being indicated in dash-dotted lines in Fig. 3;

Fig. 5 is an enlarged rear view of part of the rear housing structure of the tractor shown in Figs. 1, 3 and 4;

Fig. 6 is a side view of the housing part shown in Fig. 5;

Fig. 7 is a sectional view on line VII—VII of Fig. 5;

Fig. 9 is a detail view, in section, of a mounting bracket for a bulldozer, indicated in dash-dotted lines in Fig. 3; and Fig. 10 is a force diagram.

Features of the herein disclosed crawler tractor, and more particularly of the track frame mounting shown in Figs. 3 and 4 hereof, are claimed in a copending application Serial No. 735,195, filed March 17, 1947, by Frederick A. Schick for Track Frame Mounting for Crawler Tractors.

Figure 1:
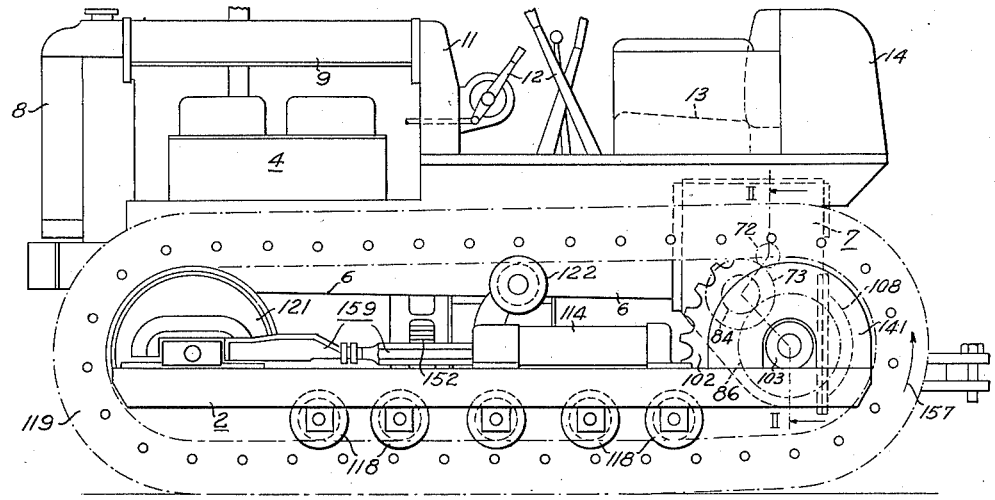
Fig. 1 is a side view of a crawler tractor.

The tractor shown in Figs. 1, 3 and 4 is of the three-point suspension type and comprises a main body generally indicated by the reference character 1 in Fig. 3, and two self-laying track units at opposite sides, respectively, of the main body, the frame of the self-laying track unit at the left side of the main body being generally indicated in Fig. 3, by the reference character 2, and the frame of the self-laying track unit at the right side of the main body being generally indicated in the same figure by the reference character 3.

Referring to Fig. 1, an internal combustion engine 4 is mounted on a frame structure 6 of the main body 1 in the usual forward position, and the frame structure 6 is rigidly secured at transversely spaced rearward portions thereof to a transmission housing which is generally indicated by the reference character 7 and which forms the rear part of the main body 1. A radiator and shell assembly 8, a hood 9, a dashboard 11, controls 12, an operator's seat 13 and a fuel tank 14 are mounted on the main body in conventional manner.

The transmission housing 7, is shown in the drawings as being constructed in the form of a fabricated structure which comprises a welded assembly of a number of plate or sheet steel members, but for the purposes of the present invention the transmission housing could be constructed, if desired, in the form of a casting. Generally, the transmission housing 7 is an integral structure which, as shown in Fig. 4, is internally partitioned to provide, a central wet compartment 16 for a bevel gear and pinion drive 17, two dry compartments 18 and 19 for steering clutches 21 and 22, respectively, and two wet final drive gear compartments 23 and 24. A pair of vertically disposed and transversely spaced intermediate walls 26 and 27 of the transmission housing are connected by top and bottom walls 28 and 29, as shown in Fig. 4, and vertically disposed front and rear walls 31 and 32, generally indicated in Figs. 3, 6 and 7, extend between and merge with the intermediate walls 26 and 27 and with the top and bottom walls 28 and 29. Partitions 33 and 34 divide the space defined by the walls 26, 27, 28, 29, 31 and 32 into the mentioned wet compartment 16 and into the two dry compartments 18 and 19. The bevel gear and pinion drive 17 forms part of a conventional mechanism for transmitting power from the engine 4 to the steering clutches 21 and 22, a common drive shaft 36 for the two steering clutches being rotatably mounted in the partitions 33, 34 and carrying the driving members of the clutches 21, 22 at its opposite ends. The construction and operation of the steering clutches conform with established principles, and while the general arrangement of the bevel gear and pinion drive 17 and of the steering clutches is schematically indicated in Fig. 4, the showing of said arrangement has been omitted in Fig. 3 in order to clarify details of the track frame mounting which will be discussed hereinbelow. The top wall 28 of the transmission housing has a suitable center opening 20, and lateral openings 30, as indicated in Figs. 5, 6 and 7, which afford the necessary access to the bevel gear compartment 16, and to the steering clutch compartments 18 and 19, respectively, for assembly purposes, and which are normally closed by covers (not shown) in conformity with usual practice.

Referring to Figs. 5 and 6, the intermediate wall 26 of the transmission housing 7 extends below the bottom wall 29 and has a straight horizontal bottom edge portion 37, a forwardly and upwardly inclined front edge portion 38, vertical front and rear edge portions 39 and 41, and a horizontal top edge 42. A rectangular boss 43 below the bottom wall 29 and adjacent to the inner side of the depending portion of the wall 26 (Fig. 5) is welded to the latter and to the bottom wall 29. Also welded to the wall 26, at the outer side thereof and in axial alinement with the clutch driving shaft 36, is an annular boss 44, and another annular boss 46 is likewise welded to the outer side of the wall 26 in forwardly and downwardly offset relation to the boss 44.

A curved plate metal member 47 (Fig. 6) which forms a continuous top, front and bottom wall of the final drive gear compartment 23 at the left side of the transmission housing is set on edge against a contiguous portion of the wall 26 and is secured thereto by welding, a portion of the wall member 47 adjacent to the wall 26 being cut out to accommodate the boss 44. The configuration of the circumferential wall 47 is such as to provide spaces of different transverse width within the final drive gear compartment 23, namely, a space of maximum transverse width in the central region, a space of reduced transverse width in the upper region, and another space of reduced transverse width in the lower region below the bottom edge 37 of the wall 26. The space of reduced width in the upper region is bounded by a dome shaped upper portion of the circumferential wall member 47 and by a substantially triangular end plate 48 which is welded along diverging upper edge portions thereof to the edge of the mentioned dome shaped upper portion of the wall member 47 in parallel and transversely spaced relation to the wall 26.

The space of maximum width in the central region of the final drive gear compartment 23 and the space of reduced width in the lower region thereof are bounded by a generally arcuate, downwardly and rearwardly extending portion of the wall member 47, and by an end plate 49 which has a zigzag top edge 51, a straight rear edge adjacent to a transverse plane through the vertical rear edge 41 of the wall 26, and continuous front and bottom edge portions conforming with the generally arcuate, downwardly and rearwardly extending portion of the wall member 47. The end plate 49 is welded along its front and bottom edge portions to adjacent edge portions of the wall member 47 in parallel and transversely spaced relation to the wall 26. A zigzag shaped filler strip 52 is welded along its opposite longitudinal edges to the zigzag top edge 51 of the end plate 49 and to a corresponding zigzag bottom edge of the triangular end plate 48 to close the transverse gap between the two end plates 48 and 49, the forward edge of the filler strip 52 being welded to a transverse edge portion 50 (Fig. 6) of the wall member 47.

The space of maximum width in the central region of the final drive gear compartment 23 is further bounded by a rectangular, horizontal bottom plate 53 which is welded along its inner longitudinal edge to the straight bottom edge 37 of the wall 26, and along its front edge to a transverse edge portion 55 (Fig. 6) of the wall member 47. A vertical closure plate 54 has a straight horizontal top edge abutting the bottom plate 53, a straight rear edge in the same transverse plane as the rear edge of the end plate 49, and a continuous front and bottom edge conforming to the configuration of the lower portion of the wall member 47. The closure plate 54 is secured in place by welding along its top edge to the bottom plate 53, and along its front and bottom edge to the wall member 47.

A relatively heavy, apertured back plate 56 is arranged in vertical position at the rear side of the final drive compartment 23, in laterally abutting relation to the wall 26 and in forwardly abutting relation to the rear edges of the wall member 47, end plate 49, filler strip 52, bottom plate 53 and closure plate 54, the back plate 56 being united with these members by welding all around the edges thereof contiguous to the back plate.

The triangular end plate 48 and the end plate 49 together with the filler strip 52 form an end wall of the transmission housing 7, at the left side of the latter, and it will be noted that the intermediate wall 26 of said housing is integrally connected with said end wall in transversely spaced relation thereto, through the wall member 47, plates 53, 54 and 56 and the associated welded connections.

Figure 2:
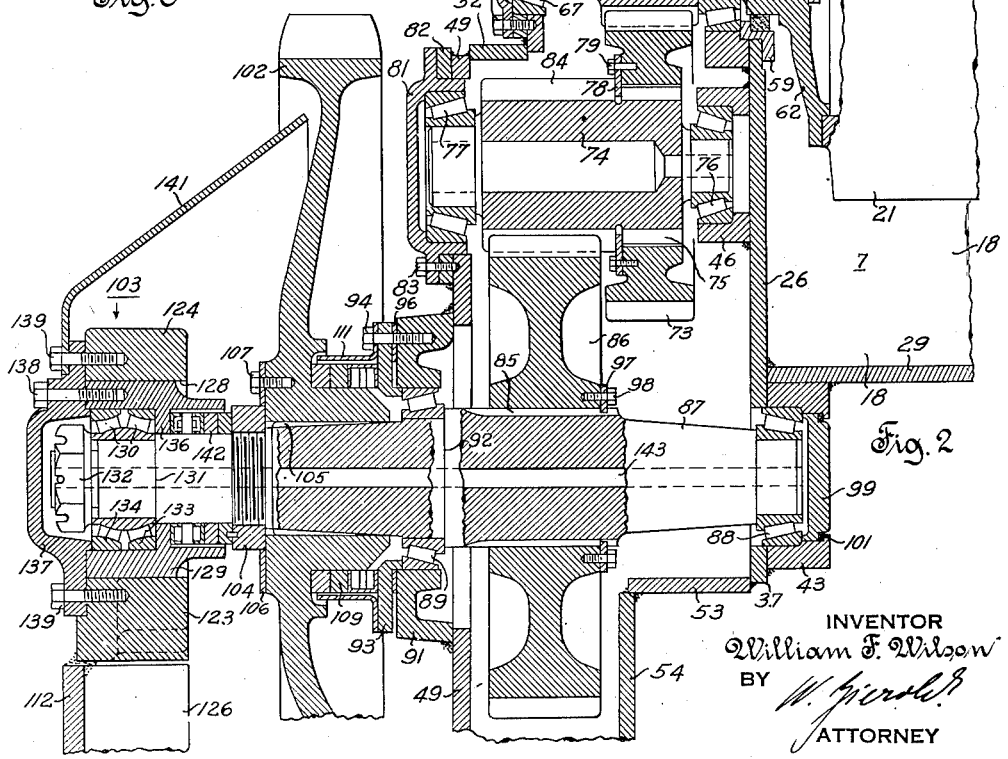
Fig. 2 is a sectional view, at an enlarged scale, on line II—II of Fig. 1.

Referring to Fig. 2, a pinion shaft 57 is connected in driven relation with the driven member of the steering clutch 21 at the left side of the tractor, the shaft 57 being axially alined with the driving shaft 36 shown in Fig. 4. The annular boss 44 which, as stated hereinbefore, is welded to the outer side of the housing wall 26, has a central bore for the reception of the outer race of a conical roller bearing 58, and the boss 44 has a counter bore adjacent to and registering with a bore in the wall 26 for the reception of a bearing and seal retainer 59 which is secured in place by cap screws 61. The inner race of the roller bearing 58 is fitted upon an intermediate portion of the shaft 57, and a driven head section 62 of the steering clutch 21 is fitted upon a tapered, splined portion 60 of the shaft 57 at the right side of the bearing 58, the head section 62 being secured against axial withdrawal from the shaft 57 in conventional manner by a cap screw 63 and washer 64. An oil seal 66 of conventional construction, for instance of the leather cuff and garter spring type is operatively interposed between the hub of the head section 62 and the retainer 59 to prevent the passage of lubricant from the final drive gear compartment 23 into the clutch compartment 18.

The pinion shaft 57 is rotatably supported at its axially outer end by means of a conical roller bearing 67 which is fitted into a bore of the triangular plate 48 and into a registering bore of a ring 68 which is welded to the outside of the plate 48 above the filler strip 52. A retainer and closure cap 69 for the roller bearing 67 is secured to the ring 68 by cap screws 71.

Integrally formed with the pinion shaft 57 in the space between the roller bearings 58 and 67 is a spur gear pinion 72 which meshes with a spur gear 73, and which latter gear forms part of an intermediate gear cluster of the final drive gear train in the compartment 23 of the transmission housing 7. The spur gear 73 has a splined central aperture for the reception of an arbor 74 which has opposite trunnions within conical roller bearings 76 and 77. The internal splines of the spur gear 73 engage external splines 75 of the arbor 74, and the spur gear 73 is secured against axial displacement relative to the arbor 74 by means of arcuate retainers 78 which are secured to the hub of the spur gear 73 by cap screws 79 and engage a circumferential groove of the arbor 74. The outer race of the conical roller bearing 76 is seated in a bore of the annular boss 46 which, as stated, is welded to the outside of the wall 26, a portion of the bore in the boss 46 being reduced in diameter to provide a shoulder for axial engagement by the outer race of the roller bearing 76.

The outer race of the bearing 77 is fitted into a bearing cap 81 which has a cylindrical portion seated in a bore of the end plate 49 and in the registering bore of a ring 82 which is welded to the outside of the end plate 49. A series of cap screws 83 extend through a flange of the cap 81 into tapped holes of the ring 82 and are drawn up to secure the roller bearings 76 and 77 in axially adjusted position.

Integrally formed with the arbor 74, at the left side of the spur gear 73, is a spur gear pinion 84 of substantially smaller pitch diameter than the pitch diameter of the spur gear 73. A large diameter spur gear 86 which meshes with the pinion 84, is mounted on a shaft 87 which constitutes one of a pair of live axles at opposite sides, respectively, of the tractor. As shown in Fig. 2, the shaft or live axle 87 at the left side of the tractor is rotatably supported on the transmission housing 7 by means of two conical roller bearings 88 and 89. The roller bearing 88 which supports the shaft 87 at its axially inner end is seated in registering bores of the intermediate wall 26 and of the rectangular boss 43. The roller bearing 89 supports the shaft 87 on the transmission housing 7 at a portion of the shaft substantially midway between its ends. A ring 91 of substantially U-shaped cross-section is seated at the edge of its outer circumferential wall over a large opening in the end plate 49, and the ring 91 is secured to said plate by an outer circumferential weld along said edge. The inner wall of the ring 91 has an axially extending cylindrical surface of a diameter to permit insertion of the outer race of the roller bearing 89 into the ring 91 under relatively light axial pressure. The inner race of the bearing 89 bears against a shoulder 92 of the shaft 87, and a bearing retainer 93 for the outer race is secured to the ring 91 by cap screws 94.

The roller bearings 88 and 89 constitute inboard bearing means which rotatably mount the axle shaft 87 on the transmission housing 7, and these bearings also function to secure the axle shaft 87 against axial displacement relative to the transmission housing, axial thrust on the shaft toward the right being taken up by the roller bearing 88, and axial thrust toward the left being taken up by the roller bearing 89. Adjustment of the roller bearings 88 and 89 to provide for rotation of the shaft 87 without appreciable radial and axial play is effected by shims 96 between the ring 91 and the retainer 93.

The spur gear 86 is connected with the shaft 87 in non-rotatable but axially separable relation. As indicated in Fig. 2, the hub of the gear 86 has axial splines which cooperate with corresponding axial splines 85 of the shaft 87 to secure the gear and shaft against relative rotation, and arcuate retainers 97 are secured to the gear 86 by cap screws 98 and engage a circumferential groove of the shaft 87 to releasably secure the gear and shaft in axially fixed relation to each other. A closure cap 99 is mounted in the bore of the square boss 43 and sealed by a packing 101.

At the left side of the transmission housing 7 the live axle shaft 87 extends through the hub of a track belt drive sprocket 102, and into an outboard bearing which is generally indicated by the reference character 103 and which cooperates with the axle shaft 87 to rotatably connect the latter in supported relation with the track frame at the left side of the tractor, as will be discussed in fuller detail hereinbelow. The hub of the track belt drive sprocket 102 has tapered axially extending splines in engagement with corresponding tapered axially extending splines 105 on the shaft 87, and a nut 104 is drawn up on the shaft 87 against the sprocket 102 to securely connect the sprocket and shaft in non-rotatable and axially fixed relation to each other. A locking plate 106 for the nut 104 is secured to the hub of the sprocket 102 by screws 107.

It is desirable to maintain a supply of lubricant within the compartment 23 of the transmission housing 7 to insure proper lubrication of the relatively contacting teeth of the gears 84, 86 and of the gears 72, 73, and also proper lubrication of the roller bearings 58, 67, 76, 77, 88 and 89. To this end, a cover 108, as shown in Figs. 1 and 3, is bolted in sealed relation to the back plate 56 (Fig. 5) of the compartment 23 to close the aperture of said back plate, and a rotary shaft seal 109 is operatively interposed between the shaft 87 and the end wall of the housing 7 adjacent to the sprocket 102. The aperture in the intermediate wall 26 through which the pinion shaft 57 extends is closed by a seal 66, as has been mentioned hereinbefore. The seal 109 is preferably of the axial contact type and may be constructed as disclosed, for instance, in U. S. 2,358,830, September 26, 1944, F. A. Schick, for Track Roller Seal. As shown in Fig. 2, the seal 109 is operatively associated with the hub of the track belt drive sprocket 102 and with the retainer 93 for the roller bearing 89, the seal being surrounded in closely spaced relation by a dirt guard 111, and the latter being held in place by the mentioned cap screws 94.

Referring to Fig. 3, the track frame 2 at the left side of the main body 1 comprises an outer side channel 112, an inner side channel 113, a suitable structure including a tubular housing 114 (Fig. 1) rigidly connected to both channels and retaining them in fixed parallel relation to each other, and a diagonal brace arm 116 which is rigidly connected at its forward end to the inner side channel 113 by a foot piece 117 and which is pivotally connected at its rear end with the main body 1 of the tractor, as will be discussed more fully hereinbelow. A series of truck rollers 118 which bear upon the lower run of a track belt 119 are mounted on the track frame 2 at the lower side of the latter, as indicated in Fig. 1 and a track belt supporting idler 121 is rotatably and reciprocably mounted between the side channels 112 and 113 at the forward end of the track frame 2. The front idler 121 is backed by a conventional recoil or track release mechanism such as disclosed, for instance, in U. S. Patent 2,326,486, August 10, 1943, E. F. Norelius, Track Release Mechanism. The mentioned tubular housing 114 preferably encloses a coil spring and other parts, not shown, of the track release mechanism. Also mounted on the housing 114 is a supporting roller 122 for the upper run of the track belt 119.

Figure 8:
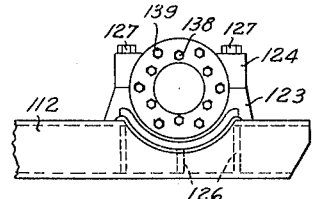
Fig. 8 is an enlarged side view of an outboard bearing at the side of the tractor shown in Fig. 1, the view of Fig. 8 being taken in the direction of arrow VIII in Fig. 4.

The mentioned outboard bearing 103 which, as stated, connects the live axle shaft 87 shown in Fig. 2, with the track frame 2, is mounted on the outer side channel 112 as a portion of the latter which extends rearwardly beyond the rear end of the inner side channel 113, and at the axially outer side of the final drive sprocket 102, as generally indicated in Fig. 3. Referring to Figs. 2 and 8, a bracket comprising a base 123 and a cap 124, extends upwardly from the channel 112 at the axially outer side of the drive sprocket 102, the top flange and part of the web of the channel 112 being cut out to accommodate portions of the bracket base 123. The latter is secured to the channel 112 by welding, and the connection between the base 123 and the channel is reinforced by vertical webs 126 inside of the channel. The cap 124 is held down on the base 123 by a pair of long vertical cap screws 127, and a semi-circular cylindrical inner surface of the cap 124 is formed concentrically with a complementary semi-circular cylindrical surface of the base 123 to provide a cylindrical opening 128 (Fig. 2) at the rear end of the track frame 2 above the side channel 112.

An annular bearing cage 129 (Fig. 2) has an axially extending cylindrical portion within the cylindrical opening 128 of the bracket 123, 124, the outside diameter of said cylindrical portion of the cage 129 closely matching the diameter of the opening 128, so that the cage will have no radial play within the opening 128 upon tightening of the screws 127 and, on the other hand, will not be distorted by such tightening of the bolts 127.

The cage 129 surrounds a portion of the live axle shaft 87 at the axially outer side of the nut 104, and a self-alining double-row roller bearing 130 is operatively interposed between the shaft 87 and the cage 129. The inner race of the bearing 130 abuts a shoulder 131 of the shaft 87, and a castellated nut 132 on a threaded end portion of the shaft 87 is drawn up against said inner race and locked by a cotter pin so as to secure the inner race of the bearing 130 in axially fixed position on the shaft 87. Two outer races 133 and 134 of the roller bearing 130 are fitted into the bearing cage 129, the outer race 133 abutting an internal radial flange 136 of the cage, and the outer race 134 being axially engaged by a short axially extended ring portion of a bearing cap 137. A circumferential series of relatively long cap screws 138 secure the cap 137 to the bearing cage 129, and another circumferential series of cap screws 139 secure the cap 137 to the bracket base 123 and to the bracket cap 124. A dished guard 141 for the track belt drive sprocket 102 is suitably secured in place at the axially outer side of the latter, preferably by means of the screws 139 which connect the bearing cap 137 to the bracket cap 124.

From the foregoing description of the outboard bearing 103 at the axially outer side of the track belt drive sprocket 102, it will be seen that said outboard bearing compises complementary load transmitting elements, such as the inner and outer races of the self-alining, double-row roller bearing 130, which are operatively associated in axial thrust transmitting relation to each other, and which are connected, respectively, in axial thrust transmitting relation with the axle shaft 87, and with the track frame 2.

The bearing cage 129 has an annular skirt portion in radially spaced relation to the axle shaft 87, which projects axially from the bracket 123, 124 at the inner side of the latter, and which terminates in proximity of the nut 104. The mentioned skirt portion surrounds a rotary shaft seal 142 which is operatively interposed between the flange 136 of the bearing cage 129 and the nut 104 on the shaft 87. The seal 142, like the seal 109 between the sprocket 102 and the bearing retainer 93, is preferably of the axial contact type.

In connection with the description of the transmission housing 7, it has been pointed out hereinbefore that the compartment 23 for the final drive gear train at the left side of the tractor forms an enclosure in which lubricant may be stored for maintaining the gear contacts of the final drive gear train and the bearings in which the pinion shaft 57, the arbor 74 and the live axle shaft 87 are rotatably mounted on the housing 7, properly lubricated. As shown in Fig. 2, the bearing cage 129 and the bearing cap 137 define a chamber, part of which is occupied by the double-row roller bearing 130, and said bearing chamber communicates with the interior of the final drive gear compartment 23 through an axial passage 143 of the live axle shaft 87, the passage 143 being formed by a central axial bore through the shaft and being open at both ends of the latter. Lubricant admitted into the final drive gear compartment 23 may therefore pass through the passage 143 into the mentioned chamber containing the double-row roller bearing 130, and the latter will therefore be automatically and adequately lubricated as long as a proper supply of lubricant is maintained in the final drive gear compartment 23. The rotary shaft seal 142 prevents loss of lubricant from the chamber containing the double-row roller bearing 130.

Designating the bearing 103 as pivot means, it will be noted that such pivot means is mounted on and has wearing surfaces, namely, the roller contacting surfaces of the inner and outer races of the roller bearing 130, outside of the transmission housing 7, and that lubricant conduit means, including the passage 143 and the cap 137, communicate with the interior of the transmission housing 7 and with the wearing surfaces of the pivot means 103. The cage 129, the cap 137 and the seal 142 also constitute means for retaining lubricant which passes from the interior of the final drive casing 23 through the opening of the passage 143 at the axially outer end of the shaft 87, in communication with the wearing surfaces of the bearing 103.

In connection with the description of the track frame 2, it has been stated hereinbefore that the diagonal brace arm 116 is pivotally connected at its rear end to the main body 1 of the tractor. As indicated in Figs. 3 and 4, a pivot pin 144 which extends through an eye 146 at the rear end of the diagonal brace arm 116 is mounted at the underside of the transmission housing 7 in axial alinement with the live axle shaft 87.

Welded to the underside of the bottom wall 29 of the transmission housing 7, and at the axially inner side of the eye 146 is a block 147 which has a semi-cylindrical recess for the reception of the pivot pin 144, and a cap 148 having a similar semi-cylindrical recess is bolted to the block 147 and bears upon the pin 144 to mount the latter at its left end on the transmission housing 7. At its right end, the pin 144 is similarly mounted by means of a block 149 and a cap 151, as indicated in Figs. 3 and 4, and as more clearly shown in Fig. 7.

From the foregoing explanations it will be apparent that the herein disclosed embodiment of the invention incorporates a live axle structure as represented by the shaft 87; outboard bearing means comprising a radially outer element as represented by the bracket assembly 123, 124, which is rigidly secured to the frame of the track unit 2, and a radially inner element as represented by the axially outer end portion of the shaft 87. The radially inner element of the outboard bearing means is rotatable in unison with the live axle shaft and associated, independently of the tractor main body, in radial load transmitting relation with the radially outer element of the outboard bearing means, whereby rearward thrust loads upon the track frame will be taken up at the rear end of the track frame side channel 112, that is, at the outer track frame mounting arm, entirely by the outboard bearing means. A pair of axially spaced inboard bearings, as represented by the roller bearings 88 and 89 rotatably mount the live axle structure at the axially inner side of the track belt drive sprocket 102 on the tractor main body. A final drive gear, as represented by the gear 86, is fixedly secured to the live axle shaft in the space between the inboard bearings; and another final drive gear, as represented by the gear 84, is rotatably mounted on the tractor main body and has teeth in mesh with the first mentioned final drive gear 86. The diagonal brace arm 116 and its pivotal mounting on the main frame by means of the pivot pin 144 provide a connection between the main body and the frame of the track unit 2 independent of the outboard bearing 103 but operative in conjunction with the outboard bearing 103, to stabilize said track frame against toeing in and out and against lateral tilting relative to the main body.

The track belt drive mechanism and the track frame mounting which have been explained hereinbefore with reference to the left side of the tractor shown in Figs. 1, 3 and 4, are substantially duplicated at the right side of the tractor. That is, the final drive gear compartment 24 at the right end of the transmission housing 7 corresponds as to its details of construction to the final drive gear compartment 23, and it encloses a final drive gear train which is arranged in driven relation with the steering clutch 22 but is otherwise a substantial duplicate of the final drive gear train which is arranged in driven relation with the steering clutch 21 at the left side of the tractor, duplicate parts at opposite sides of the tractor being designated in Figs. 3 and 4 by the same reference characters. Similarly, the track frame 3 at the right side of the tractor is constructed in substantially the same manner as the track frame 2 at the left side, and the explanations hereinabove with respect to the mounting of the track frame 2 on the main body t similarly apply to the mounting of the track frame 3, the same reference characters being used in Figs. 3 and 4 to designate duplicate parts with reference to the construction and mounting of the self-laying track mechanisms at opposite sides of the tractor.

A forward load supporting connection between the main frame 1 and the track frames 2 and 3, comprises a transverse leaf spring 152 which, as shown in Fig. 3, is pivoted intermediate its ends on the main body 1 at 153, and which has opposite end portions bearing loosely upon top portions of the track frames 2 and 3. Generally, the leaf spring 152 serves the same purpose and performs the same function as the transverse leaf spring in a conventional tractor of the three-point suspension type. That is, the spring 152 provides a forward or first suspension point, at 153, for the main frame, and it is rockable relative to the main frame so as to accommodate up and down swinging movement of the track frames about the axis of rotation of the track belt drive sprockets 102. The outboard bearing 103 which is associated with the live axle 87 at the left side of the tractor, is operative to pivotally support the main body, at a second suspension point, on the track frame 2, and the outboard bearing 103 which is associated with the live axle 87 at the right side of the tractor, is operative to pivotally support the main body, at a third suspension point, on the track frame 3. In this connection, it should be noted that the sprocket wheels 102 are so proportioned, in conformity with well-known principles, that they are normally relieved from the function of sustaining part of the weight of the main body on the track belts, such proportioning of the track belt drive sprocket 102 at the left side of the tractor being indicated in Fig. 1 by a slight upward and rearward slope of the lower run of the track belt in proximity to the track belt drive sprocket 102. The diagonal brace arm 116 of the left track frame is effective, in conjunction with the outboard bearing 103 at the left side of the tractor, to stabilize said track frame against toeing in and out and against lateral tilting about the hereinabove mentioned second suspension point, and the diagonal brace arm 116 of the right track frame 3 is similarly effective, in conjunction with the outboard bearing 103 at the right side of the tractor, to stabilize the right track frame against toeing in and out and against lateral tilting about the hereinabove mentioned third suspension.

The construction of the transmission housing 7 as an integral unit in the manner described hereinbefore provides for accurate alinement of the inboard bearing 88 with the inboard bearing 89, and similarly for accurate alinement of the bearing 76 with the bearing 77 and of the bearing 58 with the bearing 67. Such accurate bearing alinement is obtained by machining the seats for each pair of coaxial bearings on the intermediate wall 26 and on the left end wall, after these walls have been permanently united with each other through the circumferential wall 47 and other members, as has been explained hereinbefore. Due to the integral construction of the transmission housing, it is further possible to position and maintain the axis of the bearings 76, 77 in highly accurate transversely spaced relation to the axis of the bearings 88, 89 and to position and maintain the axis of the bearings 58 and 67 in highly accurate transversely spaced relation to the axis of the bearings 76 and 77.

For purposes of assembly, the pinion shaft 57 with the pinion 72 may be moved axially into the final drive gear compartment through the registering openings of the intermediate housing wall or partition 26 and of the annular boss 44, prior to the installation of the roller bearing 58 in the annular boss 44. The intermediate spur gear 73 may be installed by first moving it into the space between the walls 26 and 49 through the aperture of the back plate 56, and by then moving the arbor 74 axially through the registering openings of the end plate 49 and ring 82. While the arbor 74 is axially moved into the final drive gear compartment, the gear 73 may be held by hand in the proper position for engagement with the splines 75 of the arbor 74, and after the bearing 77 and cap 81 have been installed, the gear 73 may be secured by means of the retainers 78, the cap screws 79 being accessible through the opening of the back plate 56. The procedure of installing the gear 86 is similar to that of installing the gear 73. That is, the gear 86 is first moved into the final drive gear compartment through the opening of the back plate 56, and the axle shaft 87 is then passed axially through the ring 91 and through the hub of the gear 86 to engage the axial splines 85 of the shaft 87 with the corresponding axial splines of the gear 86. The remaining operations for positioning and securing the shaft 87 and the gear 86 in desired relation with respect to the housing 7 may then be performed without difficulty, as will be apparent from Fig. 2. The cap screws 98 for the retainers 97, like the cap screws 79 for the retainers 78, are accessible through the aperture of the back plate 56.

Steering of the tractor is effected, in the usual manner, by disengagement of one or the other of the steering clutches 21, 22, and by retarding or locking the track belt at the inner side of the turn, suitable brake mechanism, not shown, being associated for that purpose with the steering clutches in conformity with well-known and generally accepted principles. While a turn is made, say to the right, a strong lateral thrust force in the direction of arrow 154 in Fig. 3 becomes effective upon the track frame 2 and tends to swing the latter away from the main body 1, with the result that a rearward horizontal thrust in the direction of arrow 156 in Fig. 3 becomes effective upon the outer end of the live axle shaft 87 which is journaled in the outboard bearing 103 at the rear end of the track frame 2. During the assumed right-hand turn of the tractor, the track belt drive sprocket 102 at the left side of the tractor is driven by the engine 4 in the direction of arrow 157 in Fig. 1, and the arrow 158 in Fig. 3 indicates the direction in which the sprocket 102 exerts a horizontal thrust upon the live axle 87 at the left side of the tractor while the tractor is being turned to the right and a backward thrust is exerted, as pointed out hereinbefore, upon the outer end of the same live axle 87 through the track frame 2.

It will be noted that the horizontal thrust forces indicated by the arrows 156 and 158 in Fig. 3 act upon the live axle shaft 87 horizontally in opposite directions and outside of the transmission housing 7. Under these conditions, the inboard bearings 88 and 89 for the live axle shaft 87 at the left side of the tractor, and particularly the inboard bearing 89 next to the track belt drive sprocket 102, are not apt to become unduly loaded during a right-hand turn of the tractor. More particularly, the inboard bearing 89 next to the track belt drive sprocket 102 at the left side of the tractor is not apt to become loaded to such an extent as to set up internal stresses in the transmission housing 7 which would objectionably disturb the highly accurate bearing alinement and the highly accurate gear spacing which are necessary for efficient and trouble-free operation of the final drive gear train under heavy loads.

The foregoing considerations of the effect of a righthand turn upon the live axle shaft 87 at the left side of the tractor are analogously applicable to the live axle shaft 87 at the right side of the tractor in case of a left-hand turn. That is, when the tractor executes a turn to the left, the backward force on the outer side channel 112 of the right track frame is counteracted by the driving thrust of the track belt drive sprocket 102 at the right side of the tractor, with the result that the inboard bearing next to the right track belt drive sprocket is relieved from undue loads.

Each of the self-laying track mechanisms at the opposite sides of the tractor includes, as stated hereinbefore, a track release mechanism, the one at the left side being generally indicated in Fig. 1, by the reference character 159 and as shown in said figure being operatively interposed between the track frame 2 and the front idler 121. Should a rock or other solid obstruction become lodged on the lower run of the track belt 119, continued rotation of the sprocket 102 which drives said track belt in the direction of arrow 157 may force the rock to pass with the track belt around the track belt drive sprocket. In that case the front idler 121 is forced back against the resistance of the track release mechanism 159, and the tension of the track belt 119 increases considerably beyond normal. Under these conditions the track frame 2 will again exert a heavy horizontal thrust upon the outer end of the live axle shaft 87, in the direction of arrow 156 in Fig. 3, and the left track belt drive sprocket 102 will exert a heavy horizontal thrust upon the live axle 87 in the opposite direction as indicated by the arrow 158. Due to the proximity of the left outboard bearing 103 to the left track belt drive sprocket 102 a major part of the horizontal thrust upon the axle shaft 87 in the direction of arrow 156 is balanced by the counterthrust of the left track belt drive sprocket 102. In other words, a major part of the relatively opposing forces is neutralized outside and independently of the transmission housing 7, and consequently, the latter is not apt to be unduly stressed so as to objectionably disturb the mentioned highly accurate relation between the relatively movable elements of the final drive gear train at the left side of the tractor when the tension of the track belt at said side of the tractor increases considerably beyond normal and to the point where the track release mechanism 159 becomes operative. The same conditions prevail with reference to the final drive gear train at the right side of the tractor when the right track release mechanism is forced to operate.

One of the most common operations for which crawler tractors are used is to push earth moving and similar equipment, and it is usual to attach such equipment, particularly bulldozers, in thrust transmitting relation directly to the track frames rather than to the main body of the tractor. Referring to Fig. 3, the push arms of a bulldozer are indicated in dash-dotted lines at opposite sides of the tractor and designated by the reference characters 161 and 162. For purposes of attaching the bulldozer arm 161 in thrust transmitting relation to the track frame 2, a mounting bracket 163, which is shown in section in Fig. 9, may be secured to the side channel 112 of the track frame 2 somewhat ahead of the live axle 87 at the left side of the tractor, as generally indicated in Fig. 3. The mounting bracket 163 has a stubby extension at its outer side, and a spherical surface 164 is formed on said extension to provide the ball part of a ball and socket connection between the bracket 163 and the bulldozer arm 161. As indicated in Fig. 3, the connection between the bulldozer arm 161 and the track frame 2 is duplicated at the right side of the tractor to secure the bulldozer arm 162 in thrust transmitting relation directly to the track frame 3.

Referring to the force diagram shown in Fig. 10, the load condition to which the inboard bearing 89 next to the track belt drive sprocket 102 at either side of the tractor becomes subjected during bulldozing, may be analyzed as follows: The relatively opposed horizontal force components D and S represent, respectively, the reaction between the bearing 89 and its associated live axle shaft 87 due to the rearwardly directed thrust load upon the bulldozer arm at the respective side of the tractor, and the reaction between the same bearing and shaft due to the sprocket effort, that is, the tangential load on the pitch circle of the track belt drive sprocket.

The force component T represents the reaction between the bearing 89 and its associated live axle shaft 87 due to the tooth load at the point of mesh between the gears 84 and 86 of the final drive gear train at the respective side of the tractor. The direction of the component T is determined by the location of the gear 84 circumferentially of the gear 86 and by the profile of the intermeshing teeth. The angle between the components T and S as shown in Fig. 10 is based upon a circumferential positioning of the gear 84 relative to the gear 86 substantially as shown in Fig. 1 and upon a standard tooth profile.

The component W represents the reaction between the bearing 89 and its associated axle shaft 87 due to that part of the weight of the main body which must be sustained by the axle shaft at the respective side of the tractor.

For purposes of exemplification, the vectors D, S, T and W in Fig. 10 may be considered to represent the following loads, based on practical observations:

D = 25,200 lbs.
S = 17,500 lbs.
T = 19,700 lbs.
W = 10,000 lbs.

The geometrical sum of the vectors S and T is represented in Fig. 10 by the vector R-1, and the sum of the vectors R-1 and D is represented by the vector R-2. Finally, the sum of the vectors R-2 and W is represented in Fig. 10 by the vector R-3. It will be observed that the vector R-3 is relatively short, and it represents a relatively light load which, according to the hereinabove assumed figures for the components D, S, T and W, amounts to about 11,000 lbs. That means that when the tractor is pushing a bulldozer or similar earth moving equipment which is connected in thrust transmitting relation to the track frames, the inboard bearings adjacent to the track belt drive sprockets at opposite sides of the tractor, and the transmission housing 7 are not apt to become loaded to such an extent as to set up internal stresses in the transmission housing 7 which would objectionably disturb the highly accurate bearing alinement and the highly accurate gear spacing which are necessary for efficient and trouble-free operation of the final drive gear trains under heavy loads.

Referring again to Fig. 3, it will be noted that the track frames 2 and 3 are not only constructed to efficiently withstand heavy loads without twisting or bending but that the eye 146 and the outboard bearing 103 of each track frame are spaced a relatively great distance from each other, transversely of the tractor, which is a desirable feature because it provides for satisfactory stability of the track frames against toeing in and out and against lateral tilting relative to the main frame.

From Fig. 2, it will be noted that the diameter of the rotary shaft seals which are required to retain lubricant in the final drive housings, are relatively small, which is a desirable feature not only from an engineering standpoint but also from a cost standpoint.

It will further be noted from Fig. 4 that the depending portions of the final drive housings 23 and 24 and the track belt drive sprockets 102 adjacent thereto, are arranged in relatively close proximity to each other, at each side of the tractor, which is a further desirable feature because it provides for maximum transverse clearance under the transmission housing 7.

In general terms, the improved crawler tractor disclosed herein comprises a unitary housing structure forming part of the tractor main body and having downwardly extended final drive gear enclosures at its opposite sides, respectively; such unitary housing structure being represented in the illustrated embodiment of the invention by the transmission housing 7. A depending final drive gear enclosure is formed at the left side of the housing 7 by the left intermediate wall 26, the left end plate 49, the wall members 47, 52, 53 and 54, back plate 56 and cover 108; and another depending final drive gear enclosure is similarly formed at the right side of the housing 7, as explained hereinbefore.

The improved tractor further comprises a sprocket wheel, a shaft element and a pair of inboard bearings rotatably mounting said shaft element at axially spaced points thereof on a lower portion of one of said final drive gear enclosures; such sprocket wheel, shaft element and inboard bearings being represented in the illustrated embodiment of the invention by the sprocket wheel 102, shaft 87, and bearings 88, 89, at either side of the tractor.

Power transmitting means include a lower gear, as represented by the gear 86, which is nonrotatably connected within said one final drive gear enclosure, with said shaft element between said inboard bearings; an upper gear, as represented by the gear cluster 73, 84, which is rotatably mounted within said one final drive gear enclosure and which has teeth, in the present instance the teeth of gear 84, in mesh with teeth of said lower gear; and a drive pinion, as represented by the pinion 72, which is rotatably mounted within said one final drive gear enclosure and which has teeth in mesh with teeth, in the present instance the teeth of the gear 73, of said upper gear.

A rigid track frame has two mounting arms, one for connection with said sprocket wheel and the other for connection with said housing structure; the mentioned two arms being represented in the illustrated embodiment of the invention, by the rear part of the outer track frame channel 112, and by the diagonal brace arm 116.

Means independent of the aforesaid housing structure rotatably connect said one mounting arm of the track frame in radial load transmitting relation with said sprocket wheel, such independent means being represented in the illustrated embodiment of the invention by the outer end of the shaft 87 and the outboard bearing 103.

Pivot means operatively connect the aforesaid other arm of the track frame with the unitary housing structure intermediate the final drive gear enclosures, such pivot means being represented in the illustrated embodiment of the invention by a pivot pin 144 and bracket structures 147, 148, 149, 151 as shown in Figs. 3 and 5. An endless track belt is operatively mounted on the aforesaid sprocket wheel and track frame, such arrangement of the track belt in the illustrated embodiment of the invention being shown in Fig. 1.

It should be understood that it is not intended to limit the invention to the particular forms and details described hereinabove and that the invention includes such other forms and modifications as are embraced by the scope of the appended claims.

It is claimed and desired to secure by Letters Patent:

1. In a crawler tractor, the combination of, a unitary housing structure forming part of the tractor main body and having downwardly extended final drive gear enclosures at its opposite sides, respectively; a sprocket wheel; an axle structure fixedly secured to said sprocket wheel; a pair of axially spaced inboard bearings rotatably mounting said axle structure on a lower portion of one of said final drive gear enclosures; power transmitting means including a lower gear within said one final drive gear enclosure and fixedly secured to said axle structure between said inboard bearings, and an upper gear rotatably mounted within said one final drive gear enclosure and having teeth in mesh with teeth of said lower gear; a rigid track frame having two mounting arms, one for connection with said axle structure and the other for connection with said housing structure; outboard bearing means comprising a radially outer element rigidly secured to said one mounting arm, and a radially inner element rotatable in unison with said axle structure and associated, independently of said main body, in radial load transmitting relation with said radially outer element, whereby rearward thrust loads upon said track frame will be taken up at said one mounting arm entirely by said outboard bearing means; pivot means operatively connecting said other mounting arm with said housing structure intermediate said final drive gear enclosures; and an endless track belt operatively mounted on said sprocket wheel and track frame.

2. In a crawler tractor, the combination set forth in claim 1, and in which said power transmitting means further include a drive pinion rotatably mounted within said one final drive gear enclosure, a gear cluster having two gear sections, one in mesh with said drive pinion and the other forming said upper gear, and bearing means rotatably mounting said gear cluster within said one final drive gear enclosure.

3. In a crawler tractor, the combination of a main body, a live axle structure, a track belt drive sprocket fixedly secured to an intermediate portion of said live axle structure; a pair of axially spaced inboard bearings rotatably mounting said axle structure, at the axially inner side of said track belt drive sprocket, on said main body; a track frame having a mounting arm at the axially outer side of said track belt drive sprocket; outboard bearing means comprising a radially outer element rigidly secured to said mounting arm, and a radially inner element rotatable in unison with said axle structure and associated, independently of said main body, in radial load transmitting relation with said radially outer element, whereby rearward thrust loads upon said track frame will be taken up at said mounting arm entirely by said outboard bearing means; load transmitting means operatively interposed between said main body and track frame for stabilizing said track frame against toeing in and out and against lateral tilting relative to said main body; a final drive gear fixedly secured to said axle structure in the space between said inboard bearings; and another final drive gear rotatably mounted on said main body and having teeth in mesh with said first mentioned final drive gear.

WILLIAM F. WILSON.

REFERENCES CITED

The following references are of record in the file of this patent:

UNITED STATES PATENTS

| Number | Name | Date |
|---|---|---|
| 1,815,339 | Turzicky | July 21, 1931 |
| 1,865,133 | Osman | June 28, 1932 |
| 2,002,474 | Johnston et al. | May 21, 1935 |
| 2,054,782 | Day | Sept. 15, 1936 |
| 2,076,009 | Starr et al. | Apr. 6, 1937 |
| 2,146,168 | Baker et al. | Feb. 7, 1939 |
| 2,146,882 | Baker et al. | Feb. 14, 1939 |
| 2,156,565 | Johnston et al. | May 2, 1939 |
| 2,190,254 | Caproni | Feb. 13, 1940 |
| 2,225,233 | Rogers et al. | Dec. 17, 1940 |
| 2,297,485 | Lentz | Sept. 29, 1942 |
| 2,389,624 | Knox et al. | Nov. 27, 1945 |
| 2,453,360 | Burks | Nov. 9, 1948 |